United States Patent [19]
Schlecht et al.

[11] Patent Number: 5,578,752
[45] Date of Patent: Nov. 26, 1996

[54] PROCESS FOR MEASURING THE FLOW RATE OF THICK MATTER PUMPS

[75] Inventors: Karl Schlecht, Filderstadt; Axel Rockstroh, Bad Urach, both of Germany

[73] Assignee: Putzmeister-Werk Maschinenfabrik GmbH, Aichtal, Germany

[21] Appl. No.: 290,931

[22] PCT Filed: Feb. 4, 1993

[86] PCT No.: PCT/EP93/00252

§ 371 Date: Aug. 22, 1994

§ 102(e) Date: Aug. 22, 1994

[87] PCT Pub. No.: WO93/18301

PCT Pub. Date: Sep. 16, 1993

[30] Foreign Application Priority Data

Mar. 2, 1992 [DE] Germany .......................... 42 06 576.3

[51] Int. Cl.[6] .................................................. F04B 35/02
[52] U.S. Cl. ................................................................ 73/239
[58] Field of Search ............................... 73/3, 232, 239, 73/240, 241; 417/63

[56] References Cited

U.S. PATENT DOCUMENTS 5,106,272   4/1992   Oakley et al. .......................... 73/239

Primary Examiner—Robert Raevis
Attorney, Agent, or Firm—Flynn, Thiel, Boutell & Tanis, P.C.

[57] ABSTRACT

A process and device are disclosed for determining by a measurement technique the flow rate of a substance conveyed by means of a thick matter piston pump (1) through a delivery pipe (22). The thought at the basis of the invention is that the filling level of the delivery cylinder, which is required for accurately determining volumetric flow, may be inferred from the variations of the pressure in the delivery pipe. Feeding pressure in the delivery pipe (22) is thus continuously or periodically measured at predetermined time intervals by means of a pressure sensor (54). The interval between successive pressure strokes, used to determined the number of frequency of strokes, as well as the filling level of the delivery cylinder, used to determine the actual delivery volume per pressure stroke, are both derived from the time-dependent amplitude characteristic of the measured delivery pressure.

7 Claims, 3 Drawing Sheets

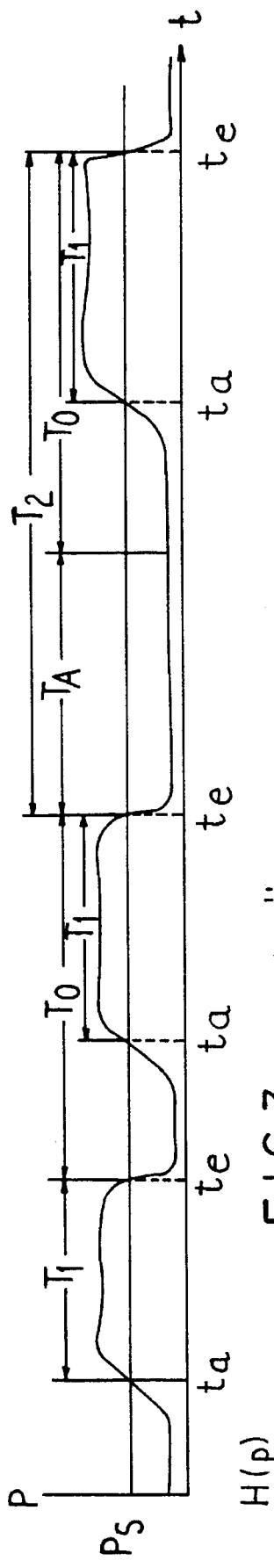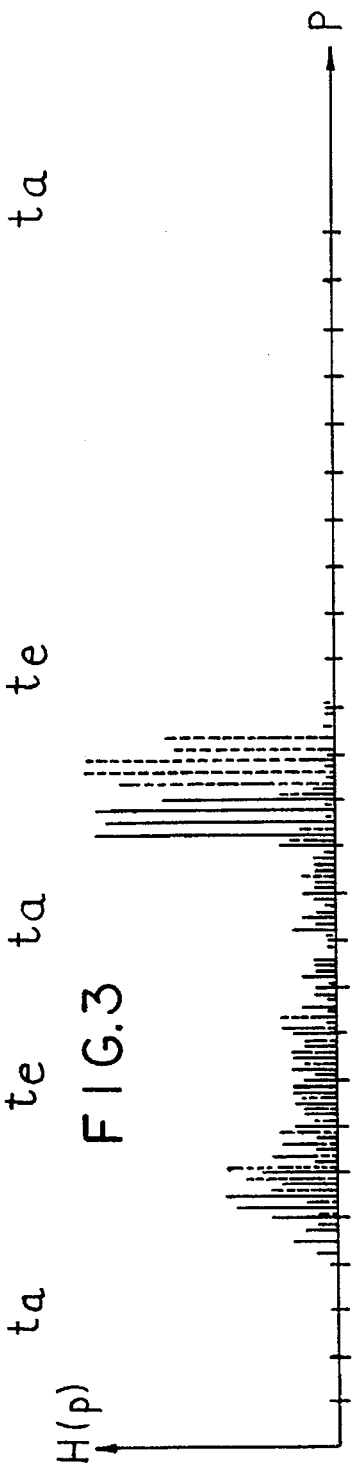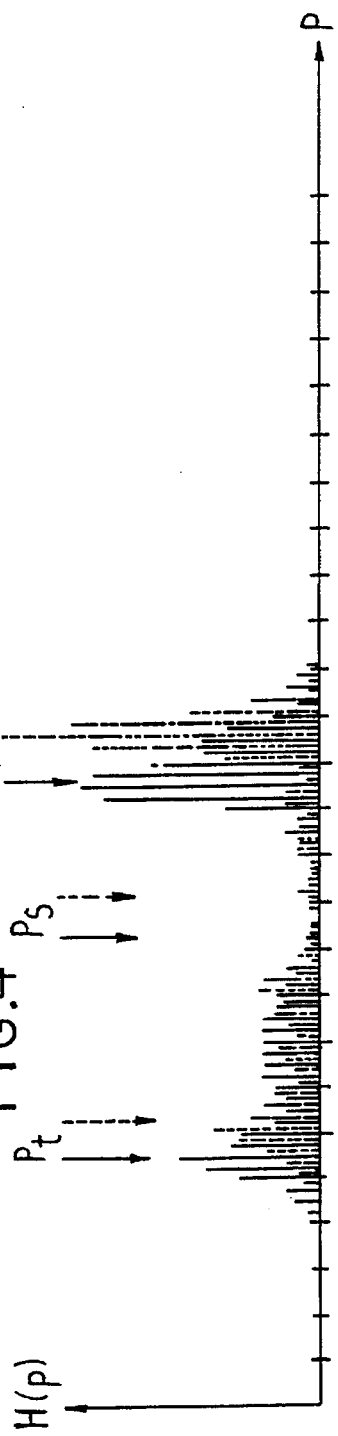

PROCESS FOR MEASURING THE FLOW RATE OF THICK MATTER PUMPS

The invention relates to a process and to an arrangement for determining the conveyance amount or of the conveyance flow of conveyance material transported by means of at least one conveyance cylinder through a conveyance line, in which the number of pressure strokes or the stroke frequency as well as the conveyance volume of the individual pressure strokes are determined and used for the computational determination of the conveyance amount or of the conveyance flow.

By thick substances there are meant in the following solid-liquid mixtures with a more or less high solid substance constituent, as they occur, for example, in partially drained settling sludges, in mixtures of coal dust and fluid or in concrete.

It is a known practice to determine the volume flow of a piston pump by multiplying the time frequency of the strokes (stroke frequency) n by the content of the delivery cylinder $V_z$:

$$q = nV_z \qquad (1)$$

Here it is not yet taken into account that the conveyance material, by reason of air adsorption and air inclusions, does not fill the entire cylinder volume and must first be compressed to the conveyance pressure before the conveyance material column in the delivery line is set in motion. This effect can be taken into account (1) by adoption of a further factor r<1 defining the degree of filling:

$$q = nV_z r \qquad (2)$$

Ordinarily the filling degree r is assumed as a constant factor. There it is not taken into account that the filling degree can be affected by the fact that the absolute pressure in the delivery line is dependent on interfering magnitudes, such as length, nature, shape and cross section, as well as the viscosity of the conveyance material and that the adsorbed air amount can vary in wide limits according to consistency and pre-pressing of the conveyance material adsorbed in the suction stroke from a filling funnel. The assumption of a constant degree of filling leads, therefore frequently to non-tolerable errors in the determination of the volume flow of thick substances.

Underlying the invention is the problem of developing a process and arrangement for the conveyance-amount measurement of thick substances, by which there can be taken into account a variable degree of filling of the delivery cylinder, regardless of its cause.

The invention proceeds from the insight that from the flow or pressure course in the delivery line conclusions can be drawn as to how long the compression time and how long the effective conveyance time continue. From the relation between the effective delivery time and the total stroke time, possibly under additional consideration of the down times, it is possible to determine the filling degree of the conveying cylinder for each stroke, and, namely, independently of the causes that can lead to a variable degree of filling.

Correspondingly, for the solution of the invention it is proposed that there be determined in each pressure stroke the time point of the flow beginning $t_a$ and of the flow ending $t_e$ of the conveyance material in the delivery line and from this the filling degree r of the delivery (conveyance) cylinder for the determination of the delivery volume per pressure stroke, $$V = r \cdot V_z \qquad (3)$$

in which $V_z$ signifies the stroke space of the conveyance cylinder. Advantageously there is measured furthermore the piston path $h_1$ of the conveyance cylinder measured between the time points $t_a$ and $t_e$ and the filling degree of the conveying cylinder from the relation $$r = h_1/h_0 \qquad (4)$$

in which $h_0$ signifies the piston stroke of the conveyance cylinder.

For the case in which the piston velocity during the conveying stroke is approximately equal, the filling degree of the conveying cylinder in each pressure stroke can be determined from the relation $$r = T_1/T_0 \qquad (5)$$

in which $$T_1 = t_e - t_a \qquad (6)$$

is the effective delivery time (conveyance time) and $T_0$ signifies the stroke time of the pressure stroke.

For the achievement of as accurate as possible measurement values, according to an advantageous execution of the invention, the flow beginning $t_a$ and/or the flow ending $t_e$ should be measured in the conveyance material in the vicinity of the end of the delivery line away from the conveyance cylinder.

The flow beginning $t_a$ and/or the flow ending $t_e$ can be determined, for example, by means of a measuring body arranged in the delivery line, flowed-about by the conveyance material and limitedly moved along its flow, as well as of a measuring probe within the delivery line responding to the position of the measuring body.

In principle it is possible to carry out the measurement also without contact by the means that the conveyance material present in the conveyance line is acted upon with ultrasound and an ultrasound signal reflected on the conveyance material or passing through this is evaluated for the determination of the time point of the flow beginning $t_a$ and/or of the flow ending $t_e$.

In order to avoid reflux losses, the conveyance line can be blocked at the end of each pressure stroke for the passage of conveyance material, so that the time point of the flow ending $t_e$ coincides with the time point of the pressure stroke end.

The process of the invention is realized technically by a flow reporter responding to the flow or non-flow of the conveyance material in the conveyance line, and a counting or calculating arrangement connected with the output of the flow reporter for the determination of the conveyance time or of the filling degree of the conveyance cylinder derived therefrom and/or of the conveyance volume of the conveyance flow. The flow reporter there can comprise a non-return valve arranged in the conveyance line, having a closing device liftable from its seat under the action of the flowing conveyance material, as well as a sensor constructed preferably as a proximity switch, responding to the opening or closing position or movement of the closing device. The non-return valve can be constructed as a flap valve, ball valve or plate seat valve. In order to preclude reflux losses in the non-return valve, the closing device can be closed over a signal triggerable at the end of a piston stroke. Instead of the non-return valve, the flow reporter can also be designed as an ultrasound probe, which can be arranged without contact on the conveyance line.

According to an advantageous execution of the invention there is provided a path-measuring arrangement for the measurement of the piston path, the output of which is connected with the counting and computing arrangement for the determination of the filling degree and/or of the conveyance volume or conveyance flow.

An alternative manner of proceeding for the solution of the problem of the invention provides that the conveyance pressure in the conveyance line is measured continuously or in predetermined time steps and that from the time-dependent amplitude course of the measured conveyance pressure there are determined both the time interval between successive pressure strokes for the determination of the stroke number, and also the filling degree of the conveyance cylinder for the determination of the effective conveyance volume per pressure stroke.

According to a preferred execution of the invention, for the determination of the filling degree in each pressure stroke an effective conveyance time and/or the piston path is measured, while that of the conveyance pressure is greater than a predetermined pressure threshold value. The pressure threshold value can be determined as an intermediate value between in each case a low pressure level and high pressure level determined from the measured amplitude course, for example according to the relation $$P_s = P_l + K(P_h - P_l) \quad (7)$$

in which $P_s$ signifies the pressure threshold value, $P_l$ the low pressure level, $p_h$ the high pressure level and $k<1$ a constant to be determined empirically.

The time interval determining the stroke number of two successive pressure strokes is advantageously determined from the time difference between two successive descending amplitude flanks of the conveyance pressure. There the time spacing of two successive pressure strokes can be composed additively of the stroke time of the pressure stroke and a possibly predetermined or measured off-time. By off-times there are meant, for example standstill times of the piston caused by switching-off, switching over between two cylinders in the case of multicylinder or two-cylinder pumps, suction phase with one-cylinder pumps or blocking of the pump in consequence of a disturbance. Further, the differing piston speed during the compression phase and conveying phase can be brought into assessment by a possibly negative down time.

The filling degree r of the conveyance cylinder can thus be determined in each pressure stroke as follows:

$$r = \frac{T_1}{T_2 - T_A} \quad (8)$$

in which $T_1$ signifies the effective conveyance time, $T_2$ the time pressure stroke spacing and $T_A$ the down time (or off-time). By substituting of (8) in (2) under consideration of the relation $$n = 1/T_2 \quad (9)$$

there is obtained for the volume flow the relation $$q = \frac{T_1 V_z}{T_2 (T_2 - T_A)} \quad (10)$$

Since the mean pressure level in the conveyance line can vary in time for various reasons, for example because the conveyance column along the conveyance line can be variously high and the static pressure is thereby changed the conveyance resistance in the conveyance line varies by reason of differing consistency, actuation of thrusting device- or switching-in of conveyance lines, the viscosity and/or the density of the conveyance medium changes, it is necessary also for the pressure threshold to be steadily adapted to the thereby changing low-pressure and high-pressure level.

This, according to a preferred embodiment of the invention, can occur by the means that the amplitude measurement values of the conveying pressure are digitally converted with a predetermined sampling rate, and are sorted according to their size into different counting storage units under triggering of a counting process, and that the frequency spectrum obtained in a measuring cycle from the counting values of all the counting storage units is evaluated under determination of an upper frequency maximum allocated to the low pressure level and of an upper frequency maximum allocated to the high pressure level and from these there is determined the pressure threshold value lying between these. The sampling rate amounts therefore expediently to a multiple, preferably to $10^2$ to $10^4$ times the stroke frequency.

In order to avoid falsifications in the determination of the low-pressure and high-pressure level and therewith of the pressure threshold value, according to an advantageous embodiment of the invention it is proposed that the counting values of the individual counting storage units, under formation of a frequency spectrum, be linked with the counting values of adjacent counting storage units additively with weighting that is diminishing in dependence on the mutual spacing. This can be done, for example, by the means that to each amplitude value there are added the adjacent values, for example with the factor 5, 3, 2 and 1. A drift in the mentioned points of concentration can be detected by the means that the measuring cycle carried out for the formation of the frequency spectrum is repeated in predetermined time intervals, in which operation the counting values of the filtered frequency spectrum of the last-detected measuring cycle can be linked with the lower-weighted counting values of the filtered frequency spectrum from the preceding measuring cycle, additively, with formation of a sum spectrum fed to the evaluation.

By this statistical evaluation of the measurement values, there is established only the pressure threshold value between the low-pressure phase and the high-pressure phase. The time measurement proper (effective conveyance time),that is necessary for the determination of the filling degree and therewith for the conveyance flow measurement is carried out in each individual pressure stroke. Further in each pump cycle the stroke time is determined in order to actualize the number of strokes per time unit (per hour) and therewith to be able to calculate the conveyance flow. The stroke time and therewith the stroke number can vary there in dependence on the time, because the piston runs more or less fast, the oil pressure or oil flow of the hydraulic drive system is changed, the resistance in the conveyance line varies, in the charging container there is present a variable filling state.

With the measuring method of the invention in addition a function control is possible, as the frequency spectrum is analyzed in respect to the presence of significant frequency maxima and/or the maintenance of a given spacing between the frequency maxima and/or the presence of measurement values above or below given limit values, for the purpose of fault monitoring and control.

The volume flow calculated from the pressure measurement values can be presented on a display or a picture screen or be transformed into an analog voltage or current signal and drawn upon for conveyance flow regulation.

A preferred arrangement for the execution of the process according to the invention has a pressure sensor arranged in the conveyance line for the continuous measurement of the conveyance pressure and an electronic evaluating unit acted on by the output signal of the pressure sensor for the determination of the stroke frequency and of the filling degree of the conveyance cylinder and of the volume flow derived therefrom.

In the simplest case the pressure sensor can be constructed as a pressure switch responding to an adjustable pressure threshold value, in which case there can be provided additionally a time counter triggerable under the condition conveyance pressure > pressure threshold value for the determination of the effective conveyance time and of the filling degree derived from it.

Advantageously the electronic evaluating unit has an analog/digital converter actable upon by the output signal of the pressure sensor and a microprocessor-controlled amplitude counter for the releasing of counting processes in a plurality of counting storers according to the size of the digital measurement values given off by the analog/digital converter with presettable sampling rate.

According to a preferred embodiment of the invention, the electronic evaluation unit has, in addition, a program for the evaluation of the counting results determined during a measuring cycle, with determination of a lower frequency maximum allocated to a low-pressure level and of an upper frequency maximum allocated to a high-pressure level, as well as of a pressure threshold value lying between the low- and high-pressure levels, as well as of a time counter releasable under the condition conveyance pressure > pressure threshold value for the determination of the effective delivery time and of the filling degree derived from it.

Further, there can be provided a program for the determination of the setting amount of a volume flow regulator from the deviation of the determined volume flow from a desired value according to a predetermined regulating algorithm. The volume flow regulator there can have as a setting member a proportional valve actable upon by the setting amount, which is arranged in a drive hydraulic system of the conveyance cylinder.

In the following the invention is explained in detail with the aid of the drawings.

FIG. 2 shows a diagram of the time course of the conveyance pressure in the conveyance line of the thick substance pump according to FIG. 1;

FIG. 3 shows a frequency spectra of the conveyance pressure amplitude recorded from the pressure course;

FIG. 4 shows a filtered frequency spectra derived from the spectra according to FIG. 3;

Figure 1:
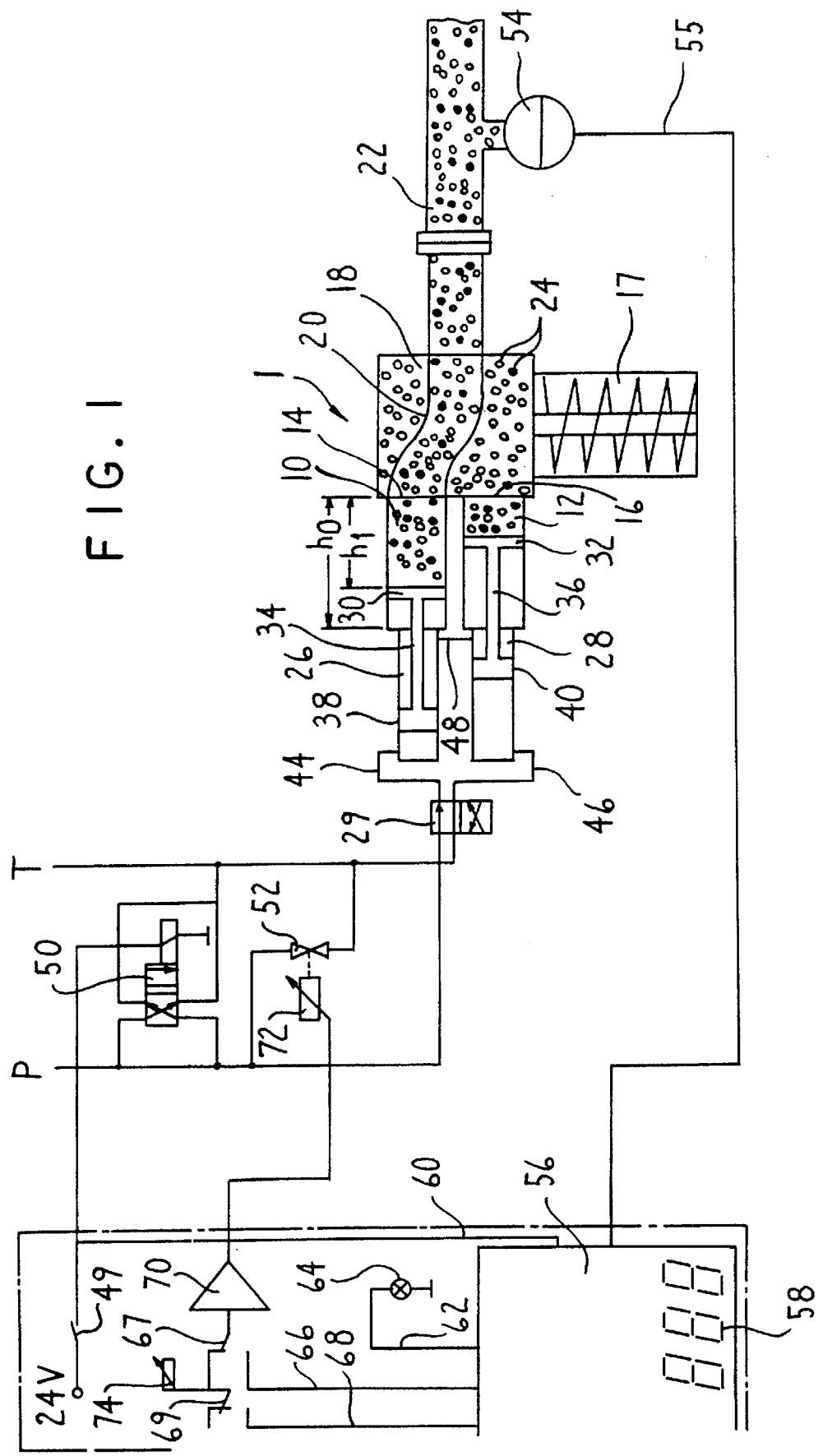
FIG. 1 shows a scheme of an arrangement for the measuring, control and regulation of the volume flow of conveyance material of a thick matter pump.

The thick matter piston pump 1, schematically shown in FIG. 1, consists essentially of two conveyance cylinders 10, 12, the side face openings 14, 16 of which issue into a material infeed container 18 chargeable over a prepressing arrangement 17 and alternately connectable during the pressure stroke over a tube switch 20 with a delivery pipe 22 during the pressure stroke and during the suction stroke and that are open during the drawing-in of the conveyance material 24 to the material infeed container 18. The conveyance cylinders 10, 12 are driven in push-pull fashion by the hydraulic drive cylinders 26, 28 through a symbolically indicated control valve 29. For this purpose the conveyance pistons 30, 32 are connected by a common piston rod 34, 36 with the pistons 38, 40 of the drive cylinders 26, 28. In the example of execution shown, the drive cylinders 26, 28 are alternately acted upon with pressure oil on the bottom side over pressure lines 44, 46 with the aid of a hydro-pump, (not represented). On their rod-side end the drive cylinders 26, 28 are coupled with one another hydraulically by a connecting line 48. The pressure fluid acting upon the drive cylinders occurs through the pump-on valve 50 electromagnetically activatable by a switch 49, while the conveyance volume of the drive cylinders and therewith also of the conveyance cylinders can be controlled and/or regulated by the proportional valve 52.

With the conveyance line 22 there communicates a pressure sensor 54, the output of which is connected over the signal line 55 and an analog/digital converter (not represented) with the input of a microprocessor-controlled evaluating electronic arrangement 56, which preferably contains a single platinum computer with digital display 58. Over a connection 60 of the evaluating electronic arrangement 56, the pump-on valve 50 can be driven and/or its state monitored. A further connection 62 of the evaluating electronic arrangement 56 is connected, for the stroke time monitoring and therewith for the function control of the pump, with a signal lamp 64. Finally, the evaluating electronic arrangement 56 also contains two regulating connections 66, 68 which are connectable, over throw switches 67, 69 and a regulating amplifier 70 with the proportional valve 52. Alternatively to this, the magnetic valve 52 can also be driven over a manually adjustable potentiometer 74.

The amplitude course of the conveyance pressure in the conveyance line 22 measured with the pressure sensor 54 is yielded from the diagram according to FIG. 2. Each pump cycle is subdivided recognizably into a compression or low-pressure phase and a conveyance- or high-pressure phase, which go over into one another over an oblique rise flank. The time spacing of two successive pressure strokes is determined best from the time difference between two successive descending amplitude flanks of the conveyance pressure. In continuous operation the time stroke spacing corresponds to the stroke time $T_0$ while in discontinuous operation the time stroke spacing $T_2$ is additively composed of the stroke time $T_0$ and of a given or measured off-time $T_A$. The effective conveyance time $T_1$ is defined by the time within a pressure stroke in which the conveyance pressure p is greater than a pressure threshold value $P_s$.

The amplitude course of the pressure signal according to FIG. 2 is statistically evaluated for the determination of the actual threshold value $P_s$ within given measuring cycles in the microprocessor-controlled evaluation electronic system 56, with the generation of a frequency spectrum H(P). For this purpose the amplitude values of the conveyance pressure are digitally converted with a predetermined sampling rate in an analog/digital converter and sorted according to provision of their size into various counting storers with the triggering of a counting process.

In FIG. 3 there is plotted the frequency spectrum obtained in two successive cycles from the counting values of all the counting storers in the form of solid-line beams for the last measuring cycle and in the form of broken-line beams for the penultimate measuring cycle in dependence on the conveyance pressure. These spectra already show two pronounced points of concentration in the zone of the low-pressure level $P_l$ and of the high-pressure level $P_h$. In order to avoid falsifications in the determination of the low and high pressure level, the counting values of the individual counting storers (beams in FIG. 3) are linked with formation of a filtered frequency spectrum with the counting values of adjacent counting storers additively with weighting decreasing in dependence on the mutual spacing. There arise there the filtered spectra represented in FIG. 4, of which the thin beams represented in solid lines belong to the last measuring cycle and the beams in broken lines to the penultimate measuring cycle. Between the two cycles, the points of concentration of the low-pressure level $P_l$ and of the high-pressure level $p_h$ wander, and therewith the pressure-threshold value $P_s$ also the pressure threshold $P_s$ is determined from these two according to the relation (7), in the direction of smaller values. The filling-degree determination which is definitively influenced by the pressure-threshold value $P_s$, adapts itself therefore to the variable absolute pressure in the conveyance line. Additionally, the drift of the points of concentration between two successive measuring cycles can be damped still by the numerical means that the counting values of the filtered frequency spectrum of the last-covered measuring cycle (solid-line thin beams) can be linked additively with the lower-weighted counting values of the filtered frequency spectrum from the preceding measuring cycle (broken-line beams) with formation of a sum spectrum supplied to the evaluation (fat superposed beam pieces in FIG. 4).

Figure 5:
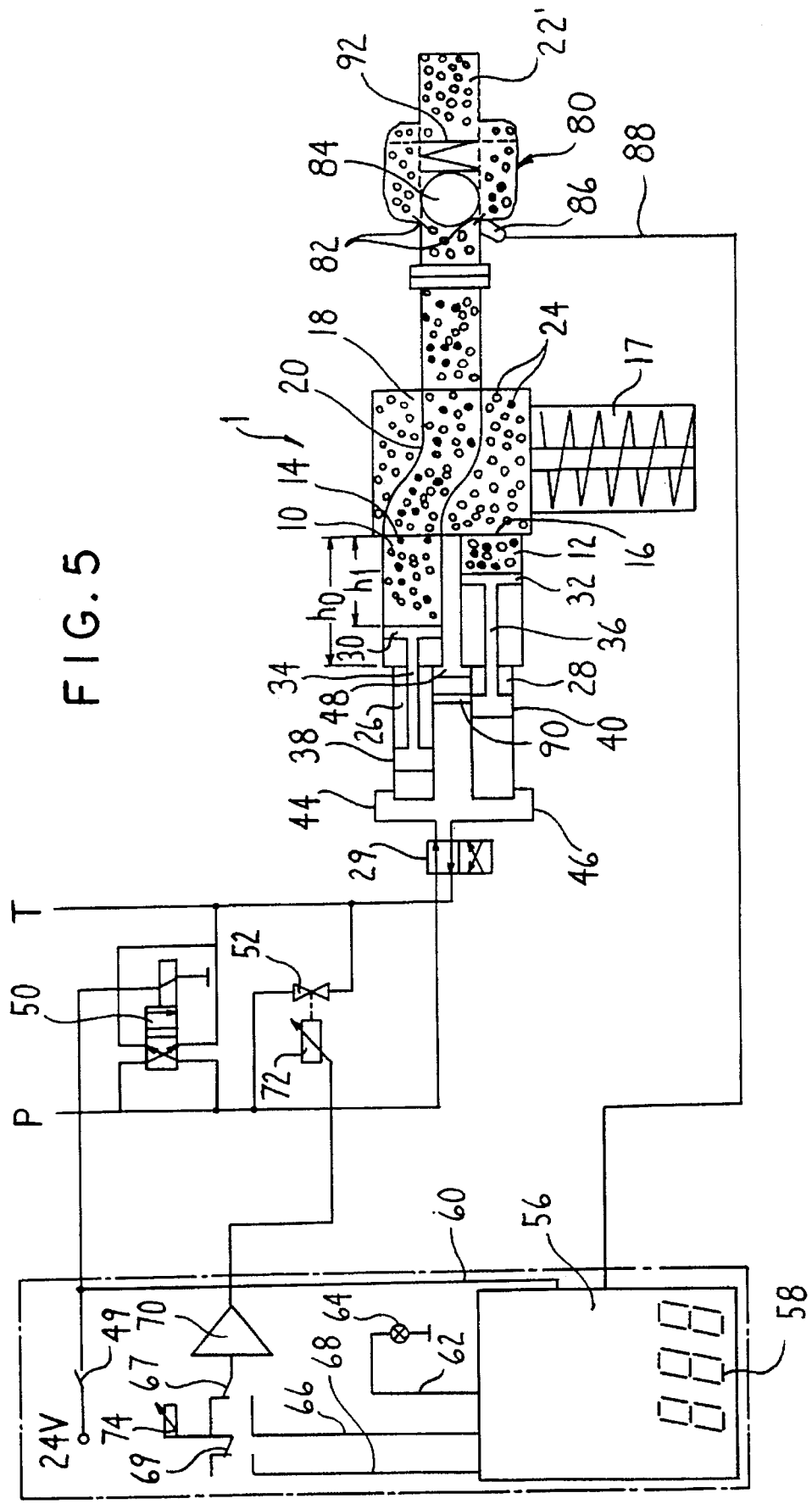
FIG. 5 shows a scheme of a flow sensor arranged in the conveyance line according to FIG. 1.

In FIG. 5 it is schematically indicated that in the vicinity of the conveyance line end 22, there is arranged a flow reporter 80 is arranged which consists of a non-return valve with valve seat 82 and spherical closing body 84 as well as of an approach switch 86 responding to the position of the valve ball 84. The signal line 88 of the approach switch 86 is connected with the evaluating electronic arrangement 56. Further, with the piston rods 34, 36 of the conveying cylinders 10, 12 there is coupled a path meter 90 which on each pressure stroke of the conveyance cylinder transmits a path signal to the evaluating electronic arrangement 56. As, in the pressure stroke, the closing body 84 is lifted from the valve seat 82 of the flow reporter 80 under the action of the conveyance material 24 flow in the conveyance line 22, over the signal line 88 of the approach switch 86 a signal is given off to the evaluating electronic arrangement 56 and the momentary position of the conveying piston 30, 32 in the conveying cylinder 10, 12 is determined. The stroke interval $h_1$, still to be covered by the piston with respect to the total stroke interval $h_0$, is a measure for the filling degree r of the conveying cylinder and determines the conveyance amount transported in the respective pressure stroke through the conveyance line 22. At the end of a pressure stroke the closing body 84 is pressed, for example over a spring 92, against the valve 82 and an undesired reflux is prevented. After reversal of the tube bypass and releasing of a pressure stroke on the other conveyance cylinder this process is repeated. The measured conveyance amounts of each pressure stroke are added up by means of a counting or computing arrangement in the evaluating electronic arrangement 56 and brought to display in the display 58. Further, therewith a conveyance amount regulation in the sense of the preceding statements is possible.

In summary, the following is to be stated: The invention relates to a process and to an arrangement for the technical measuring determination of the conveyance flow of conveyance material, which is transported by means of a thick-substance piston pump 1 through a conveyance line 22. Underlying the invention is the thought that from the pressure course in the delivery line conclusions can be drawn about the filling degree of the conveyance cylinder, which are necessary for an accurate determination of volume flow. Correspondingly, it is proposed according to the invention that the conveyance pressure in the conveyance line 22 be measured continuously in predetermined time steps and that from the time-dependent amplitude course of the measured conveyance pressure there can be determined both the time interval between successive pressure strokes for the determination of the stroke number or stroke frequency, and also the filling degree of the conveyance cylinder for the determination of the effective conveyance volume per pressure stroke.

We claim:

1. In a process for the determination of the conveyance amount or of the conveyance flow of a thick-matter piston pump including the steps of: providing at least one conveyance cylinder for thick matter; transporting thick matter through a conveyance line by said at least one conveyance cylinder; continuously measuring a conveyance pressure (p) in the conveyance line; determining a stroke number or stroke frequency as well as a conveyance volume of the individual pressure strokes from the measured conveyance pressure (p); computing a volume flow from the measured conveyance pressure (p); measuring a time spacing ($T_2$) between successive pressure strokes from a time-dependent amplitude course of the measured conveyance pressure; determining the stroke number, a stroke frequency and a filling degree (r) of the conveyance cylinder from the measured time spacing; determining an effective conveyance volume per pressure stroke from the stroke number, the stroke frequency and the filling degree (r); the improvement comprising: in the step of determining the filling degree (r) in each pressure stroke, measuring at least one of an effective conveyance time ($T_1$) and a piston path ($h_1$) when the conveyance pressure (p) is greater than a predetermined pressure threshold value ($p_s$); and further comprising the steps of digitally coverting the amplitude measurement values of the conveyance pressure at a predetermined sampling rate; sorting the digitally converted amplitude measurement value of the conveyance pressure according to size into various counting storers; counting the values in all of the counting storers; transforming the counted values of all the counting storers into a frequency spectrum thereof, and determining a pressure threshold value ($p_s$) between a lower frequency maximum allocated to a low-pressure level ($p_l$) and of an upper frequency maximum allocated to a high-pressure level ($p_h$).

2. The process according to claim 1, further comprising the steps of evaluating the frequency spectrum with respect to a presence of significant frequency maxima, maintaining a predetermined spacing between the frequency maxima, and a presence of measurement values above or below predetermined limit values for the purpose of error monitoring and control.

3. The process according to claim 1, wherein the sampling rate is a multiple, preferably the $10^2$- to $10^4$-fold multiple of the stroke frequency.

4. The process according to claim 1, further comprising the step of additively linking the counting values of the individual counting storers, under formation of a filtered frequency spectrum, with the counting values of adjacent counting storers with weighting decreasing in dependence on the mutual spacing.

5. The process according to claim 1, wherein the steps of continuously measuring the conveyance pressure (p) in the conveyance line; determining the stroke number or stroke frequency as well as the conveyance volume of the individual pressure strokes from the measured conveyance pressure (p); computing the volume flow from the measured conveyance pressure (p); measuring the time spacing ($T_2$) between successive pressure strokes from the time-dependent amplitude course of the measured conveyance pressure; determining the stroke number, the stroke frequency and the filling degree (r) of the conveyance cylinder from the measured time spacing; determining the effective conveyance volume per pressure stroke from the stroke number, the stroke frequency and the filling degree (r); determining the filling degree (r) in each pressure stroke, measuring at least one of an effective conveyance time ($T_1$) and the piston path ($h_1$) when the conveyance pressure (p) is greater than the predetermined pressure threshold value ($p_s$); digitally coverting the amplitude measurement values of the conveyance pressure at the predetermined sampling rate; sorting the digitally converted amplitude measurement value of the conveyance pressure according to size into various counting storers; counting the values in all of the counting storers; and transforming the counted values of all the counting storers into the frequency spectrum thereof define a measuring cycle executed for the formation of the frequency spectrum; and further comprising the step of repeating the measuring cycle at predetermined time intervals.

6. The process according to claim 5, further comprising the step of additively linking the counting values of the filtered frequency spectrum of the last-detected measuring cycle with the lower-weighted counting values of the filtered frequency spectrum from the preceding measuring cycle, thus creating a sum spectrum fed to the step of determining the pressure threshold value ($p_s$).

7. The process according to claim 1, wherein the step of continuously measuring the conveyance pressure is repeatedly measured at discrete time intervals.

\* \* \* \* \*

UNITED STATES PATENT AND TRADEMARK OFFICE
CERTIFICATE OF CORRECTION

PATENT NO. : 5,578,752
DATED : November 26, 1996
INVENTOR(S) : Karl SCHLECHT et al It is certified that error appears in the above-indentified patent and that said Letters Patent is hereby corrected as shown below:

Column 8, line 36; change "coverting" to ---converting---.

Column 9, line 14; change "coverting" to ---converting---.

Signed and Sealed this

Twenty-ninth Day of April, 1997

Attest:

BRUCE LEHMAN

*Attesting Officer*   Commissioner of Patents and Trademarks